(12) United States Patent
Kulkarni et al.

(10) Patent No.: US 11,480,254 B2
(45) Date of Patent: Oct. 25, 2022

(54) METHOD FOR MANUFACTURING A BLOCK FORGED SWING CHECK VALVE BODY WITH A FULLY ENCAPSULATED SEAT RING

(71) Applicant: Crane ChemPharma & Energy Corp., The Woodlands, TX (US)

(72) Inventors: Sudhir K. Kulkarni, Cincinnati, OH (US); Sachin S. Chaudhari, Pune (IN); Ranjit N. Bhalkar, Pune (IN)

(73) Assignee: Crane ChemPharma & Energy Corp., The Woodlands, TX (US)

( * ) Notice: Subject to any disclaimer, the term of this patent is extended or adjusted under 35 U.S.C. 154(b) by 218 days.

(21) Appl. No.: 16/668,758

(22) Filed: Oct. 30, 2019

(65) Prior Publication Data

US 2020/0132203 A1    Apr. 30, 2020

Related U.S. Application Data

(60) Provisional application No. 62/753,347, filed on Oct. 31, 2018.

(51) Int. Cl.
*F16K 15/03* (2006.01)
*B23P 15/00* (2006.01)

(52) U.S. Cl.
CPC ............ *F16K 15/03* (2013.01); *B23P 15/001* (2013.01); *B23P 15/002* (2013.01)

(58) Field of Classification Search
CPC ....... F16K 15/03; B23P 15/001; B23P 15/002
See application file for complete search history.

(56) References Cited

U.S. PATENT DOCUMENTS

| | | | |
|---|---|---|---|
| 1,828,478 A | 10/1931 | Sparks | |
| 2,065,035 A | 12/1936 | Taylor | |
| 2,312,290 A * | 2/1943 | Watt, V | F16K 15/03 137/527.4 |
| 3,486,733 A | 12/1969 | Gordon, Jr. | |
| 4,230,150 A * | 10/1980 | Scaramucci | F16K 15/03 137/527 |
| 4,252,144 A * | 2/1981 | Scaramucci | F16K 15/03 137/527.2 |
| 4,443,920 A | 4/1984 | Oliver | |
| 4,566,671 A | 1/1986 | Beson | |
| 4,911,407 A | 3/1990 | Paul, Jr. | |
| 6,969,047 B2 | 11/2005 | Hotton et al. | |

(Continued)

FOREIGN PATENT DOCUMENTS

| | | |
|---|---|---|
| CN | 201306481 Y | 9/2009 |
| CN | 201448486 U | 5/2010 |

(Continued)

OTHER PUBLICATIONS

International Search Report and Written Opinion for PCT Application No. PCT/US2019/040109, dated Sep. 20, 2019, 9 pgs.

(Continued)

*Primary Examiner* — P. Macade Nichols

(57) ABSTRACT

A block forged swing check valve body includes a fully encapsulated seat ring. The swing check valve body includes a through hole and a chamber having a shelf portion defined by a D-shaped passageway. The shelf portion overlies an annular shoulder that encapsulates the valve seat. Methods for the manufacturing and use thereof are also provided.

19 Claims, 8 Drawing Sheets

(56) References Cited

U.S. PATENT DOCUMENTS

| | | |
|---|---|---|
| 8,205,860 B2 | 6/2012 | Song |
| 8,403,296 B2 | 3/2013 | Phillips |
| 8,689,996 B2 | 4/2014 | Wolfe et al. |
| 9,897,215 B2 | 2/2018 | Hunter et al. |
| 2008/0308159 A1* | 12/2008 | Stunkard ............. F16K 27/0209 |
| | | 137/315.33 |
| 2011/0277985 A1 | 11/2011 | Mosman |
| 2013/0000745 A1* | 1/2013 | Witkowski ............. F16K 15/03 |
| | | 137/527 |

FOREIGN PATENT DOCUMENTS

| | | |
|---|---|---|
| CN | 102734506 A | 10/2012 |
| CN | 203627856 U | 6/2014 |
| CN | 105715834 A | 6/2016 |
| CN | 2016159560 U | 5/2017 |
| CN | 107671221 A | 2/2018 |
| CN | 207715831 U | 8/2018 |

OTHER PUBLICATIONS

International Search Report and Written Opinion for PCT Application No. PCT/US2019/058851, dated Jan. 23, 2020, 14 pgs.
Supplementary European Search Report dated Feb. 17, 2022, in connection with European Application No. 19880397.5, 11 pages.

\* cited by examiner

METHOD FOR MANUFACTURING A BLOCK FORGED SWING CHECK VALVE BODY WITH A FULLY ENCAPSULATED SEAT RING

This application claims the benefit of U.S. Provisional Application No. 62/753,347, filed Oct. 31, 2018 and entitled "Method for Manufacturing A Block Forged Swing Check Valve Body With A Fully Encapsulated Seat Ring," the entire disclosure of which is hereby incorporated herein.

FIELD OF THE INVENTION

The present disclosure relates generally to a swing check valve body, and in particular to a method of manufacturing a block forged valve body having a fully encapsulated seat ring, and to the block forged swing check valve body with a fully encapsulated seat ring and the method for the use thereof.

BACKGROUND

Swing check valves typically include a valve body having a flow passageway and a swing check valve that pivots about a hinge axis to open or close the flow passageway. Typically, a valve seat is positioned in the flow passageway to interface with the valve as it moves between the open and closed positions. In some embodiments, the valve seat is not fully encapsulated around the circumferential periphery thereof, which leads to the valve seat being susceptible to deflection or deformation. Deformation of the valve seat may lead to delamination of the seat ring, for example of a hard seal surface applied thereto, which may contaminate and/or damage the media passing through the valve and equipment located downstream of the valve, or lead to less than optimum sealing of the valve.

In some applications, the valve body may be made from a casting or die forging, which allows for the formation and definition of various features. Casting and die forging require expensive and unique molds and dies, which are not easily reconfigured. As such, the casting and die forging processes do not lend themselves to easily reconfiguring the shape and function of the valve body, for example if a larger valve and/or through opening is required.

In other applications, the valve body may be configured by connecting a plurality of separate parts, for example coupling top, middle and bottom portions, or side portions, with mechanical fasteners. These types of valve bodies, however, require additional fasteners and sealing interfaces, and are more susceptible to leakage, for example over time, than a one-piece valve body.

For these reasons, the need remains for a one-piece swing check valve body that provides for full encapsulation of the valve seat, while also allowing for easy reconfiguration of the different passageways and openings to accommodate different valve mechanisms.

SUMMARY

The present invention is defined by the following claims, and nothing in this section should be considered to be a limitation on those claims.

In one aspect, one embodiment of a method of manufacturing a swing check valve body includes block forging a one-piece body having opposite ends, opposite sides, a top and a bottom. The method further includes machining a through hole, which has a first minimum diameter and extends along a first axis, between the opposite ends. The through hole defines a flow passageway. The method also includes machining a chamber, which has a second minimum diameter and extends from the top along a second axis orthogonal to the first axis. The chamber includes a bottom defined by a floor, which separates the chamber from the through hole. The method further includes machining a D-shaped passageway through the floor between the chamber and the through hole and thereby defining a semi-circular shelf portion overlying the through hole, and machining an annular shoulder, which has a third diameter and extends along the first axis under the shelf portion. The annular shoulders is coaxial with the through opening. The method further includes inserting a valve seat in the annular shoulder.

In another aspect, a method of manufacturing a swing check valve assembly further includes pivotally mounting a swing check valve in the one-piece body, including in one embodiment securing a base on the shelf above the through hole. The swing check valve includes a support arm pivotally mounted to the base and a valve head coupled to the support arm. The support arm and valve head are pivotable about a hinge axis from a closed position, wherein the valve head is disposed in the through hole in engagement with the valve seat, to an open position, wherein valve head is spaced apart from the valve seat.

In another aspect, one embodiment of a swing check valve body includes a one piece block forged body having opposite ends, opposite sides, a top and a bottom. The block forged body further includes a through hole, which has a first minimum diameter and extends along a first axis between the opposite ends. The through hole defines a flow passageway. A chamber has a second minimum diameter and extends from the top along a second axis orthogonal to the first axis. The chamber includes a bottom defined by a floor separating the chamber from the through hole. A D-shaped passageway extends through the floor between the chamber and the through hole. The floor includes a semi-circular shelf portion overlying the through hole. An annular shoulder has a third diameter and extends along the first axis under each of the shelf portions. The annular shoulder is coaxial with the through opening. A valve seat is disposed in the annular shoulder.

In yet another aspect, one embodiment of a swing check valve assembly includes a swing check valve pivotally mounted to the one-piece body. In one embodiment, the swing check valve includes a base secured to the shelf above the through hole, a support arm pivotally mounted to the base and a valve head coupled to the support arm. The support arm and valve head are pivotable about a hinge axis defined by the base from a closed position, wherein the valve head is disposed in the through hole in engagement with the valve seat, to an open position, wherein valve head is spaced apart from the valve seat.

The various embodiments of the swing check valve body and swing check valve assembly, methods of manufacturing the swing check valve body and swing check valve assembly, and the methods for the use thereof, provide significant advantages over other swing check valve bodies, valves and methods of manufacture and use. For example and without limitation, the disclosed swing check valve body and method of manufacture allow for the use of a one-piece valve body, which avoids the need for fasteners and sealing interfaces, and thereby ensures the integrity of the valve body. At the same time, by using a block forged body, the various subsequent machining operations may be easily altered or modified to accommodate differently sized internal valve components, such as the valve support arm and valve head. In addition, the forging and machining operations provides for shelf, which ensures that the valve seat is fully encapsulated around the entire circumference thereof, and therefor extends the life of the valve by avoiding deformation and/or delamination of the valve seats.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1A:
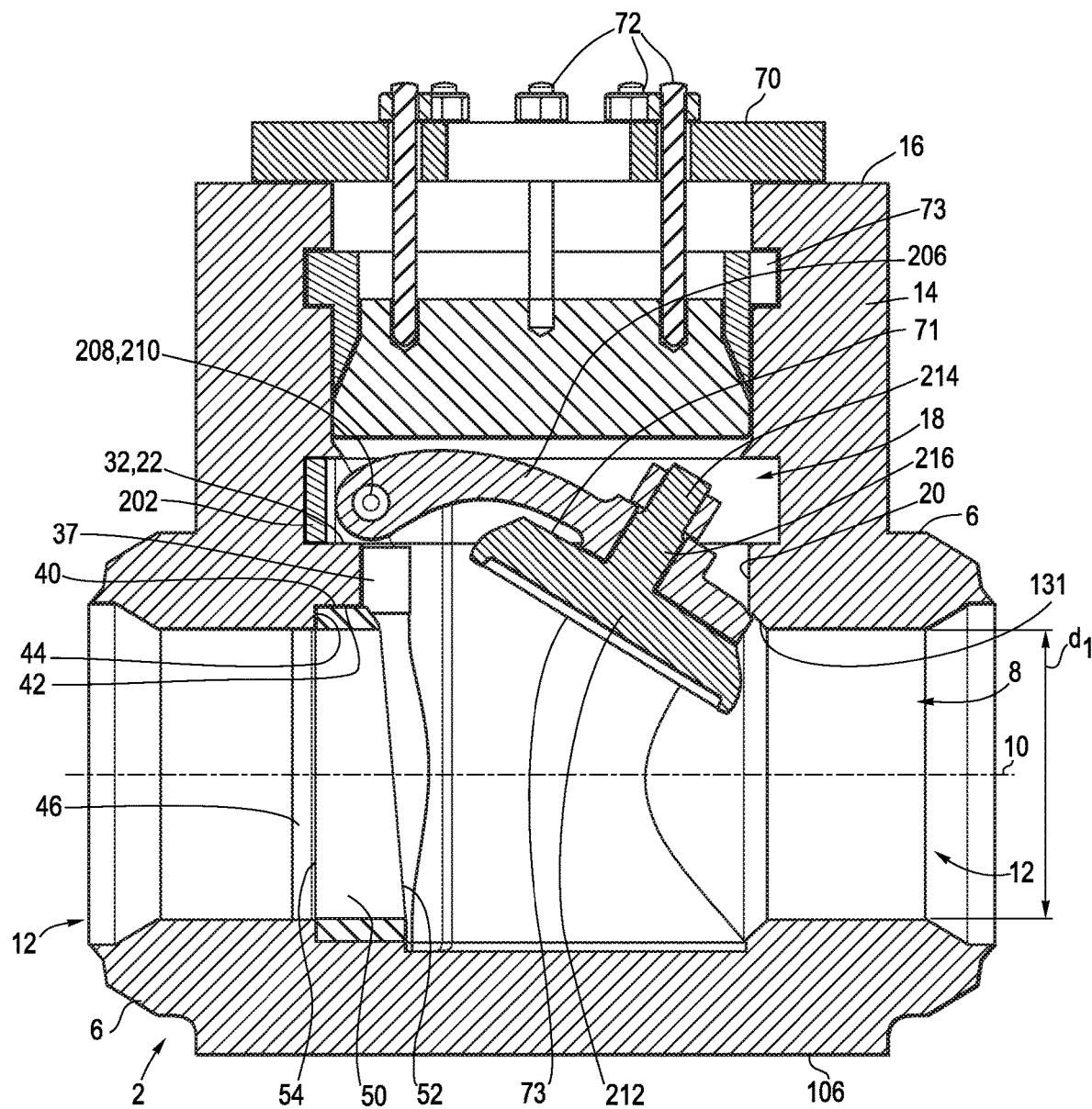
FIGS. 1A and B are cross-sectional views of a swing check valve in an open and closed position respectively.

It should be understood that the term "plurality," as used herein, means two or more. The terms "outboard" and "inboard" refer to the relative position of different features relative to a common axis or plane. The term "coupled" means connected to or engaged with, whether directly or indirectly, for example with an intervening member, and does not require the engagement to be fixed or permanent, although it may be fixed or permanent (or integral). The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" diameter may be later referred to as a "second" diameter depending on the order in which they are referred. It should also be understood that designation of "first" and "second" does not necessarily mean that the two components or values so designated are different, meaning for example a first diameter may be the same as a second diameter, with each simply being applicable to separate components. The terms "vertical" and "horizontal" refer to the orientation of various components as shown in the drawings, but with the understanding that those components may be rotated and used in other orientations.

Valve Body:

Referring to FIGS. 1A-5, a swing check valve assembly 2 is shown as including a one-piece valve body having an inverted T-shape, with a pair of cylindrical end portions 6 defining an interior flow passageway 8 that extends along a longitudinal axis 10 between opposite ends of the body. The end portions each have an interior passageway 12, which may be cylindrical or tapered with a varying diameter, defined by a minimum diameter (d1), for example and without limitation between 9.50 inches to 13.50 inches, of the flow passageway 8.

A neck portion 14, which may be cylindrical, extends upwardly from the end portions. The neck portion includes a top surface 16 defining a top of the body. The neck portion defines an interior chamber 18 having a circumferential side wall 20, a bottom defined by a floor 22 and an open top. The side wall is configured with a pair of circumferential grooves 21, 23 and a rib 25 extending radially inwardly into the chamber. The chamber extends downwardly into the neck portion from the top along a longitudinal axis 30 that extends transverse to the longitudinal axis. In one embodiment, the axes 10, 30 are orthogonal or perpendicular. It should be understood that the chamber may have a cross-sectional shape other than a circle, including for example and without limitation various polygonal shapes, or other elliptical shapes.

Figure 4:
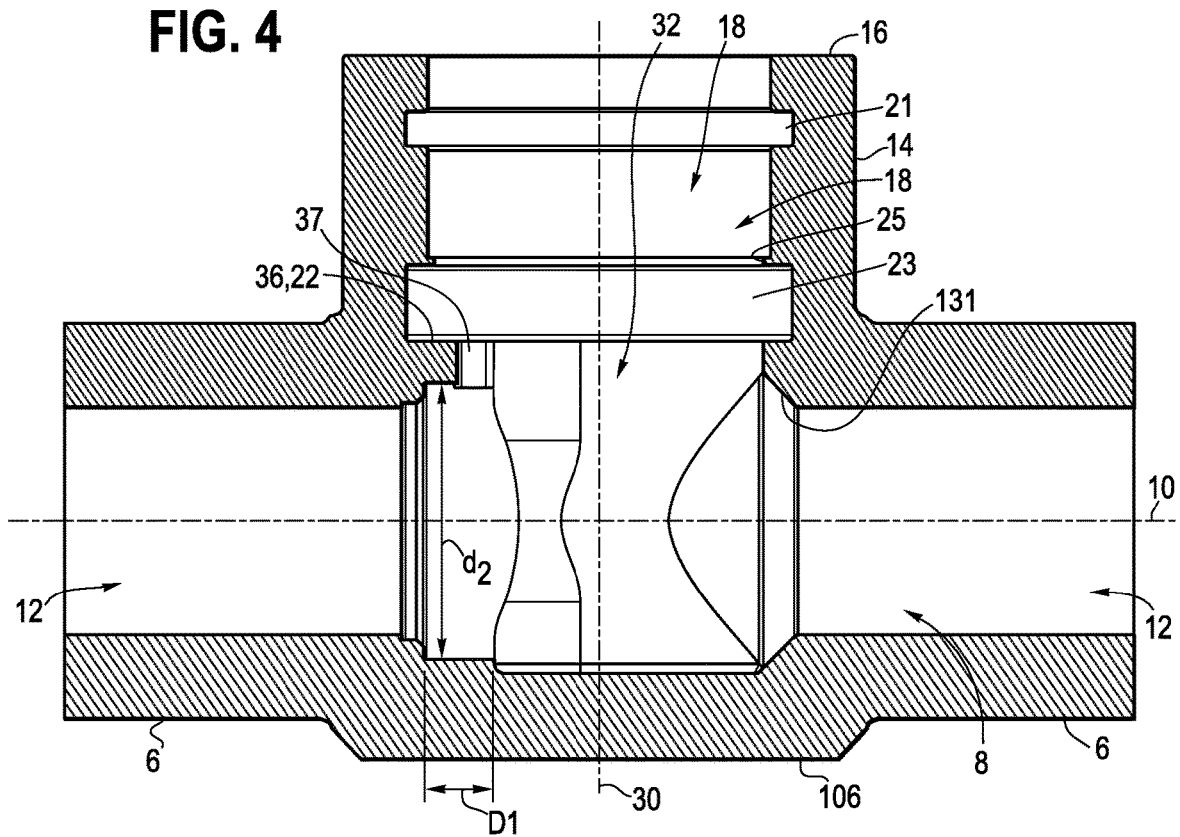
FIG. 4 is a vertical cross-sectional view of the swing check valve body shown in FIG. 2.
Figure 5:
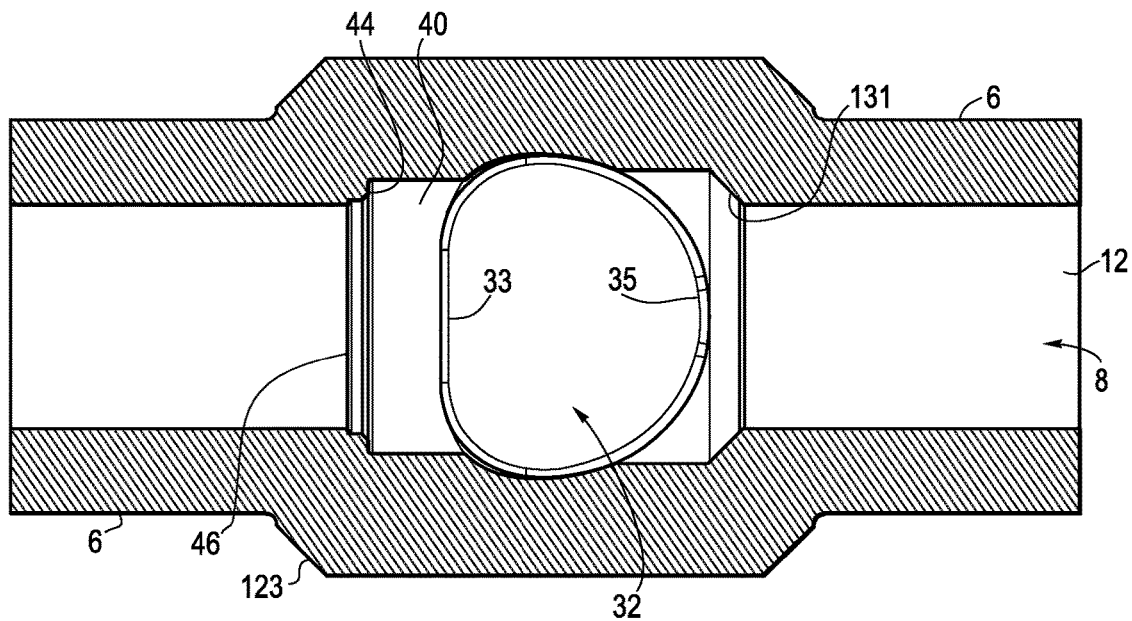
FIG. 5 is a horizontal cross-sectional view of the swing check valve body shown in FIG. 3.

A D-shaped passageway 32 extends through the floor between the chamber 28 and the flow passageway 8. In one embodiment, the D-shaped passageway has a first linear side 33 and an opposite curved side 35 when viewed from above along the vertical axis 30, with the curved side matching the shape of the chamber disposed above the D-shaped passageway. The curved side may have the same radius as the radius of the rib 25, or may have other radius dimensions less than the minimum radius of the chamber 18. In one embodiment, the groove 23 has a greater radius than the rib 25 and the curved side 35, such that the floor 22 extends around the entirety of the passageway 32 at the bottom of the chamber 18, defining a ledge portion 27. The D-shaped passageway 32 extends down through and across the through-hole 108 and flow passageway 8 as shown in FIG. 4 to form a lower chamber defining in part the flow passageway 8 and through hole. The D-shaped passageway 32 is dimensioned to accommodate the movement of a valve support arm 206 and valve head 212 through the passageway 8 as further disclosed herein. The D-shaped passageway 32 may be continued into the bottom of the body below the flow passageway 8 and defining a lower recess or cavity 60. Due to the difference in the shapes of the D-shaped passageway 32 and the cylindrical chamber 18, and in particular the groove 23, a portion of the floor includes a shelf portion 36 defined along the linear side 33 having a generally semi-circular shape, with the shelf portion 36 and ledge portion 27 being contiguous. A vertical groove 37 extends through the floor 32, to provide clearance for the valve support arm, with the shelf portion 36 having a bat-wing shape as shown in FIGS. 6H-J.

An annular shoulder 40 extends along the longitudinal axis circumferentially around the flow passageway 8 beneath the shelf portion 36. The annular shoulder has a circumferential surface 42 and a rear surface 44 defining a corner. The circumferential surface portion of the annular shoulder has a minimum diameter d2 that is greater than the minimum diameter d1 of the flow passageway, and a depth D1 (e.g., 2.1 inches to 3.93 inches), otherwise referred to as a width. The annular shoulder is coaxial with the flow passageway 8 along axis 10.

An annular valve seat 50 is disposed in the annular shoulder 40. In one embodiment, the valve seat 50 is made of SA 182 F91/SA 335 P91. The valve seat has a front side 52 downstream and a backside 54 facing upstream. The backside 54 is engaged with the rear wall 44 of the annular shoulder 40. The valve seat has a circumferential surface 56 with a second depth D2, otherwise referred to as a width, which may vary in one embodiment of the valve seat, which is tapered as explained in more detail below. The depth D2 is greater than the depth D1, or more than 100% of the depth D1 such that engagement of the valve seat 50 by a corresponding valve head is ensured as further explained below, and preferably the depth D2 is between 125% and 135% of the depth D1. In other embodiments, D1 is greater than D2, with D2 being between 90 and 100% of the D1. In one embodiment, the entirety of the circumferential surface 42 having depth D1 is in contact with the circumferential surface 56 of a corresponding valve seat, while in other embodiments at least 75% of the circumferential surface is in contact. It should be understood that the depth D1 is measured to the linear side 33 of the shelf portion, rather than to the side of the groove 37. It should be understood that the valve seat 50 is axially fixed relative to the annular shoulder 40.

As shown in FIGS. 1A and B, the valve seat 50 may have a tapered thickness or width, with the face 52 of the valve seat 50 being tapered and lying in a plane 53 forming an angle α relative to a vertical axis 55 extending through a hinge axis 208. The backside 54 of the valve seat is orthogonal to the axis 10 and parallel to the vertical axis 55. The plane 53 intersects the hinge axis 208, such that the face 73 of the valve is aligned with and properly seals against the face 52 of the valve seat. The inboard portion of the annular shoulder 40 has a corresponding taper, with the circumferential surface having a greater depth at the bottom of the valve body than at the top of the valve body underlying the shelf.

A second annular shoulder 46, which may be formed as a groove, is formed in the end portion outboard of the first annular shoulder relative to the longitudinal axis 30. The second annular shoulder 46 has a minimum diameter (e.g., 8.41 to 24.88 inches), extends along the longitudinal axis 10 and is coaxial with the first annular shoulder 40 and the flow passageway 8. The diameter of the second annular shoulder is less than the diameter of the first annular shoulder, and greater than the minimum diameter of the flow channel.

A cavity 60 is formed at the bottom of the passageway 32 beneath the flow passageway 8 in horizontal alignment with the overlying chamber along the longitudinal axis 30.

The valve seat 50 is welded to the end portions of the body at the second annular shoulder or groove 46, which abuts the backside of the valve seat. As shown in FIG. 1, the valve seat 50 is encapsulated by the valve body, and in particular the annular shoulder 40, meaning that at least 75% of the depth D2 of the valve seat is surrounded by the valve body around the entire circumference of the valve seat. As mentioned, the valve seat may be made of SA 182 F91/SA 335 P91, and may include a hard sealing surface, or hardfacing, on the front side thereof, including for example and without limitation a Stellite® hardfacing.

Valve Components

Referring to FIGS. 1-5, a pressure seal bonnet 70 is secured to the top of the valve body with a plurality of fasteners 72 to close the open top of the chamber 18. A graphite gasket 74 forms the seal.

Figure 1B:
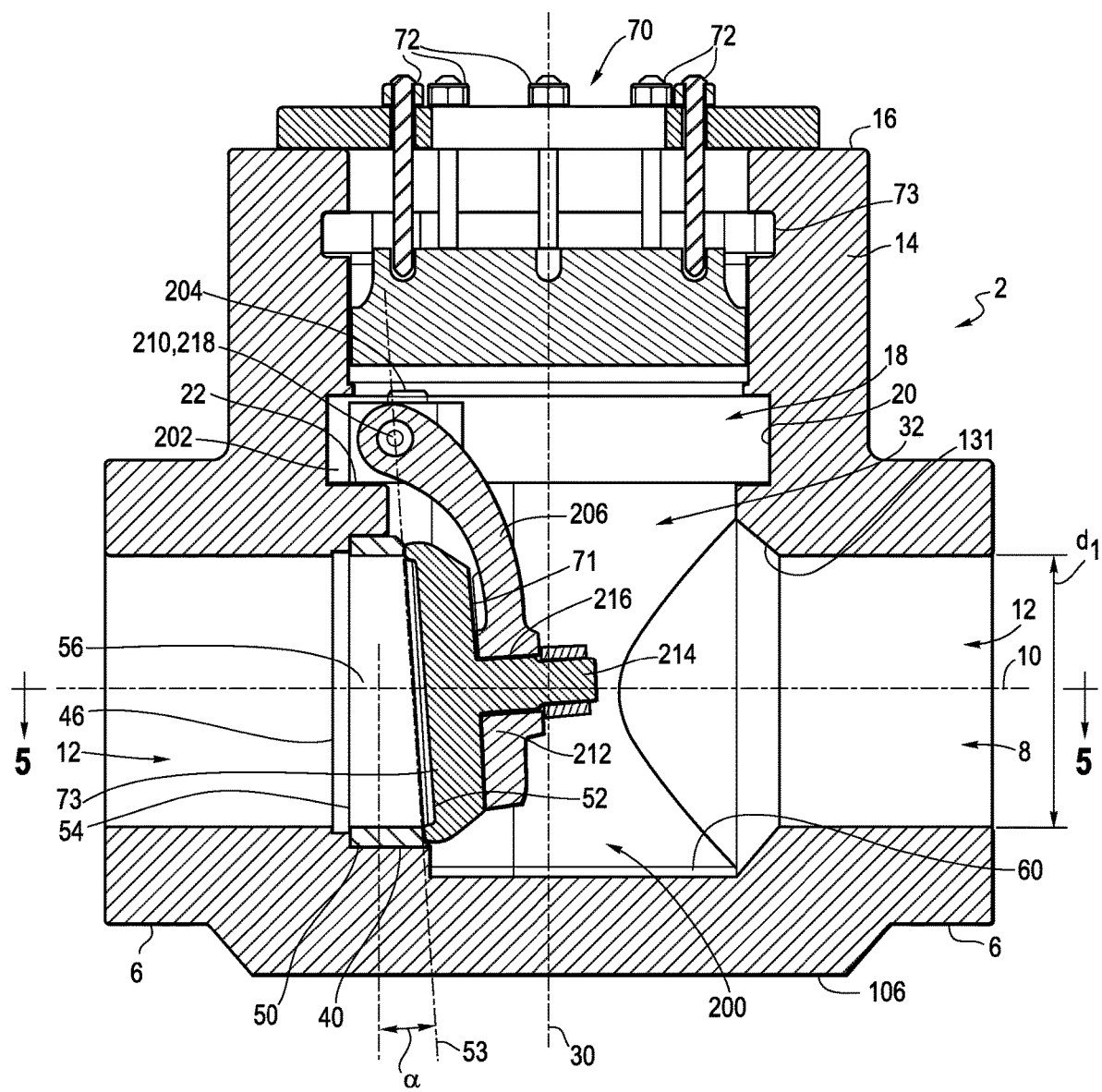
Figure 2:
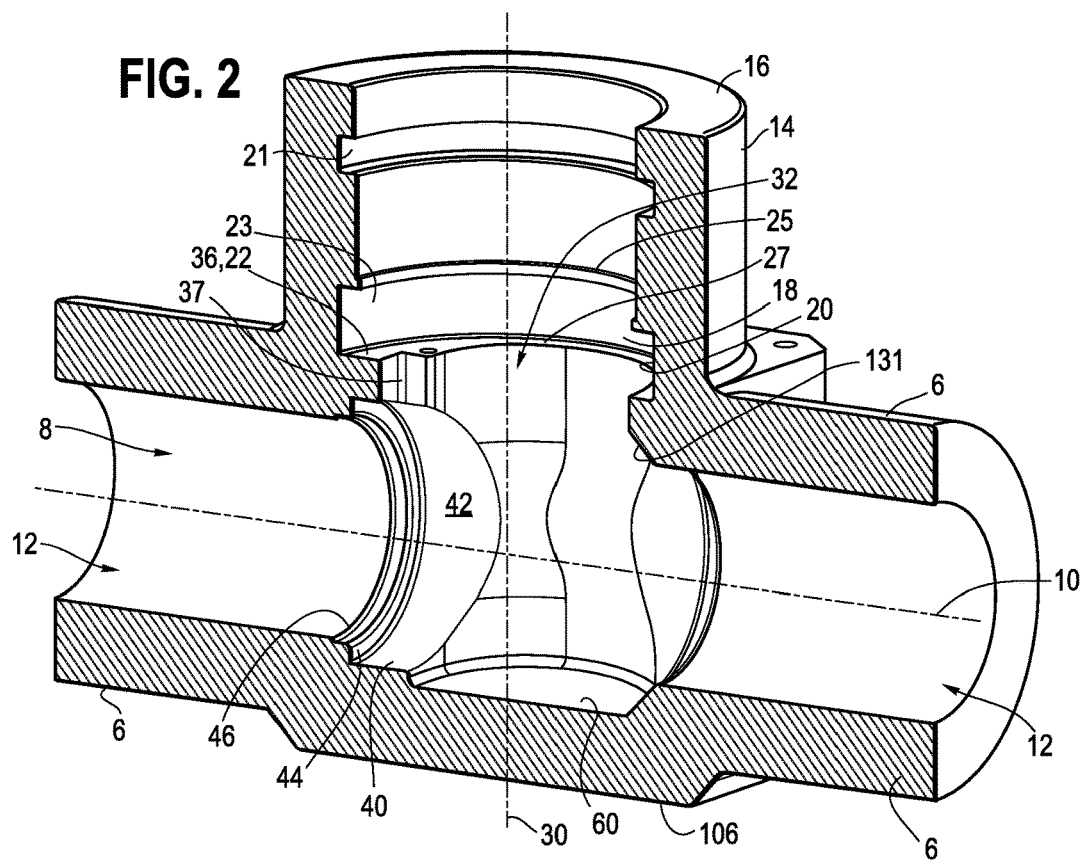
FIG. 2 is a perspective cross-sectional view of one embodiment of the swing check valve body shown in FIG. 1.
Figure 3:
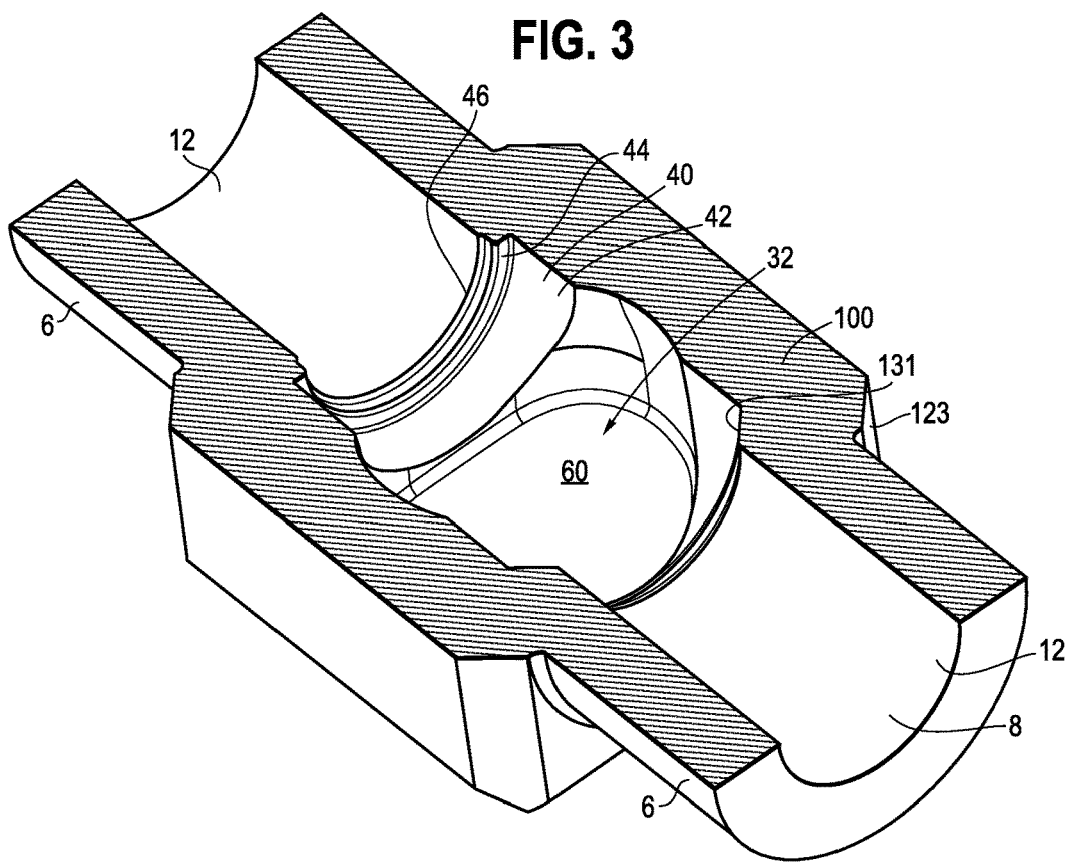
FIG. 3 is a perspective cross-sectional view of the swing check valve body shown in FIG. 1.

A swing check valve 200 is pivotally mounted to the one-piece body inside the chamber. In particular, the swing check valve 200 includes a base 202 secured to the shelf 36 above the through hole 108 with fasteners 204. A support arm 206 is pivotally mounted to the base about a hinge axis 208, for example with a hinge pin 210. The support arm 206 is curved such that the support arm has clearance when the valve is moved to the closed position as shown in FIG. 1B, with the arm being partially disposed in the groove 37. A valve head 212, having a disc shape, is coupled to the support arm, for example with a stem 214 inserted through an opening 216 in the support arm at a location spaced apart from the hinge axis 208.

In operation, the support arm 206 and valve head 212 are pivotable about the hinge axis 208, which is horizontal in one embodiment, from a closed position, wherein the valve head 212 is disposed in the flow passageway 8 or through hole 108 in engagement with the valve seat 50, to an open position, wherein valve head 212 is spaced apart from the valve seat 50. The valve is self-actuated, with fluid flow in the flow passageway lifting the valve head and moving it to the open position (FIG. 1A). The support arm engages a surface 131, defining a stop, on the valve body to limit the pivoting movement of the support arm and valve as shown in FIG. 1A. If the flow stops, or is limited, the valve will move to the closed position, for example in response to gravity. In addition, if there is reverse flow in the opposite upstream direction, the reverse flow will act on a rear 71 of the valve, causing the valve head 212 to move to the closed position as shown in FIG. 1B. In the closed position, the periphery of the front surface 73 of the valve head engages the valve seat 50 as shown in FIG. 1B.

Manufacture of the Valve Body

Figure 6A:
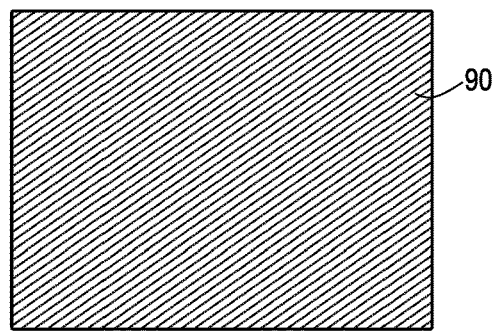
FIGS. 6A-J show a process flow for a block forged swing check valve body.
Figure 6B:
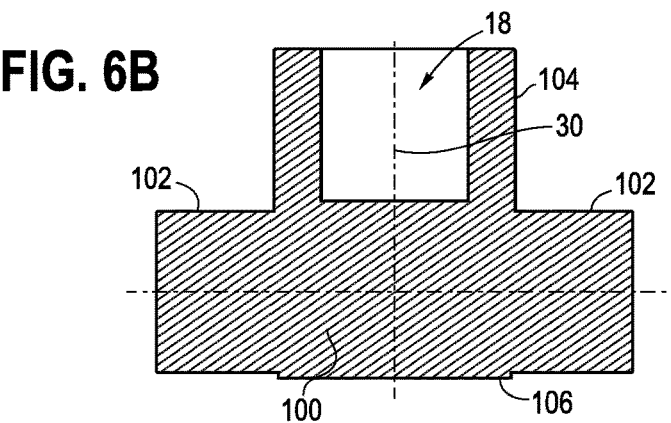
Figure 6C:
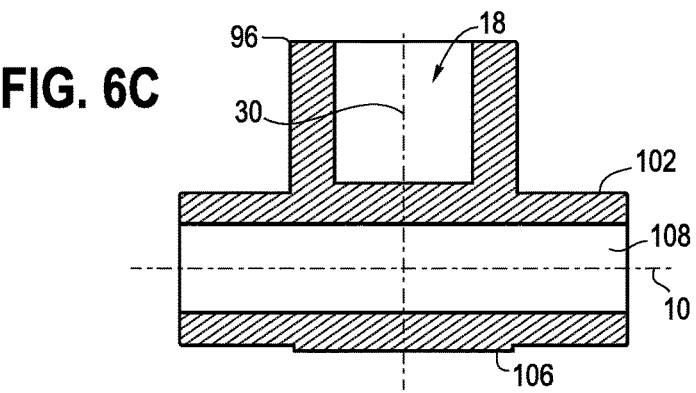
Figure 6D:
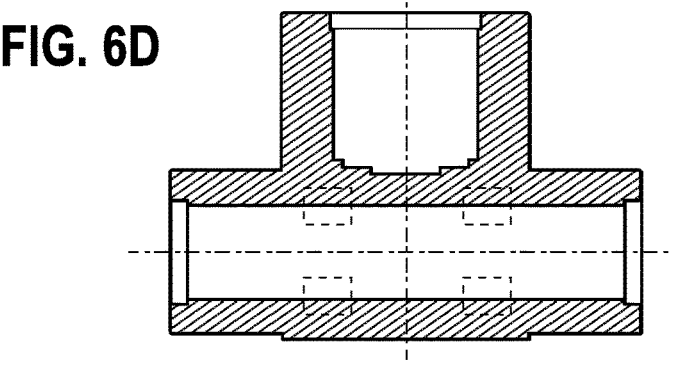
Figure 6E:
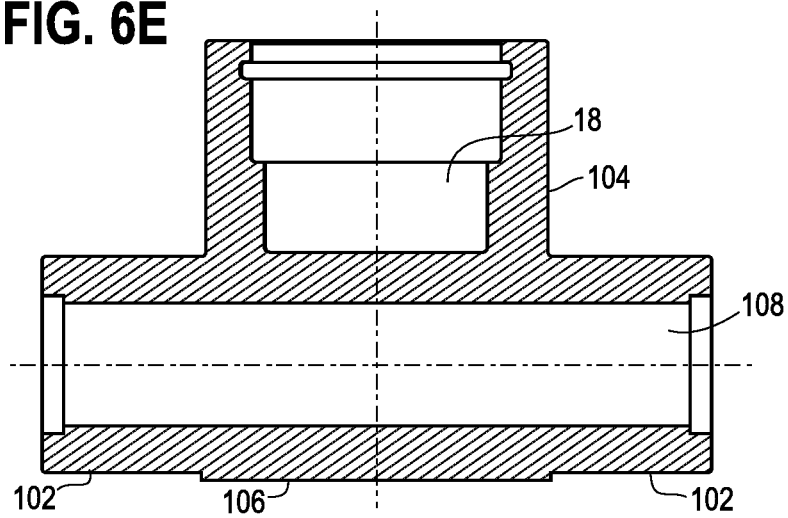
Figure 6F:
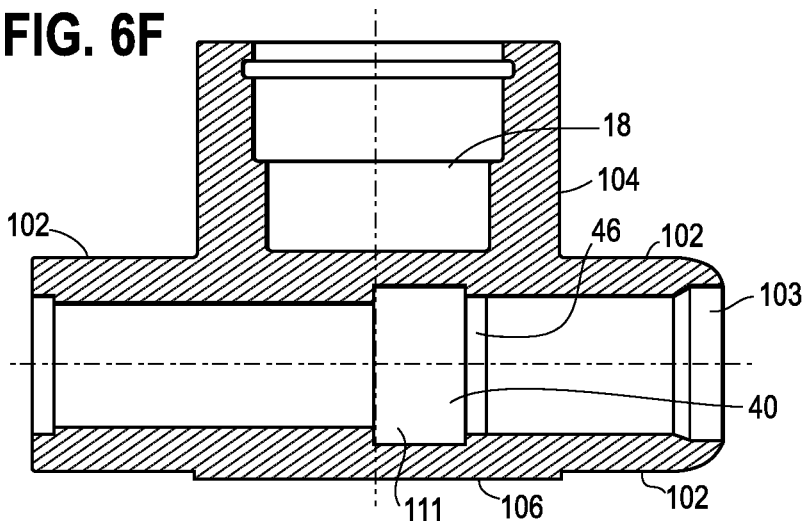
Figure 6G:
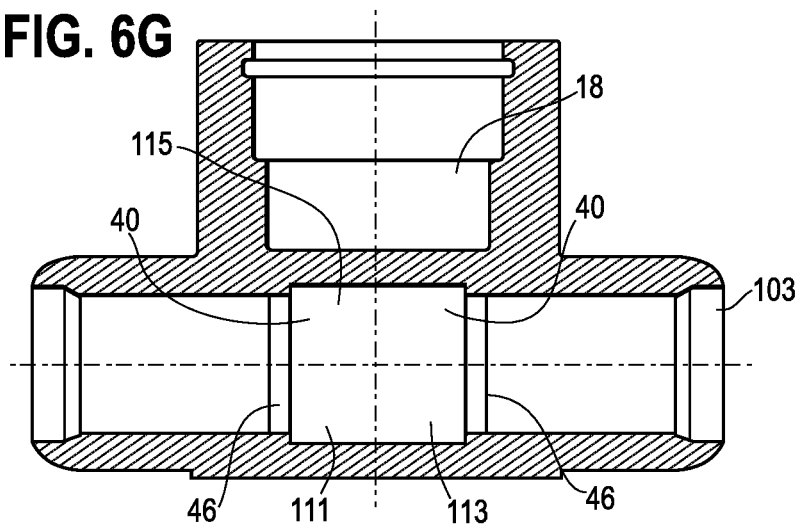
Figure 6H:
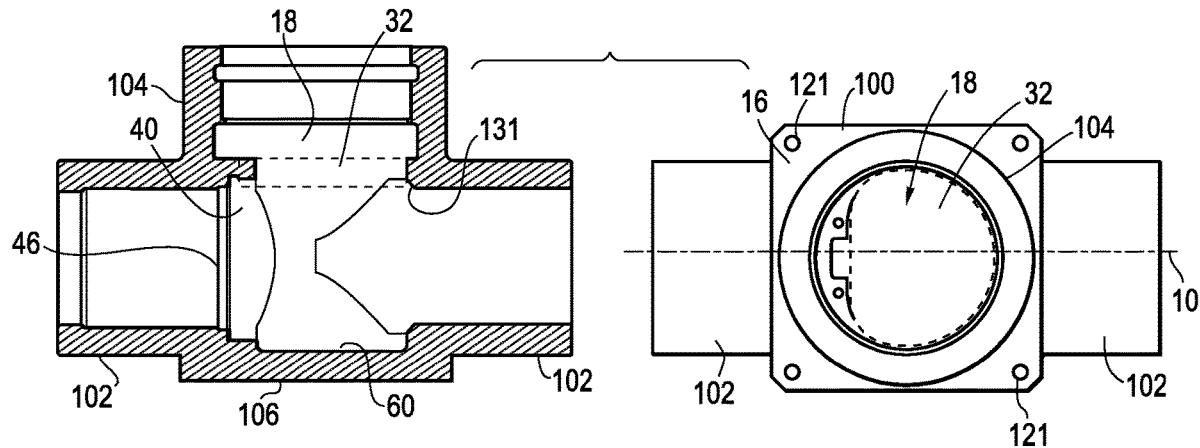
Figure 6I:
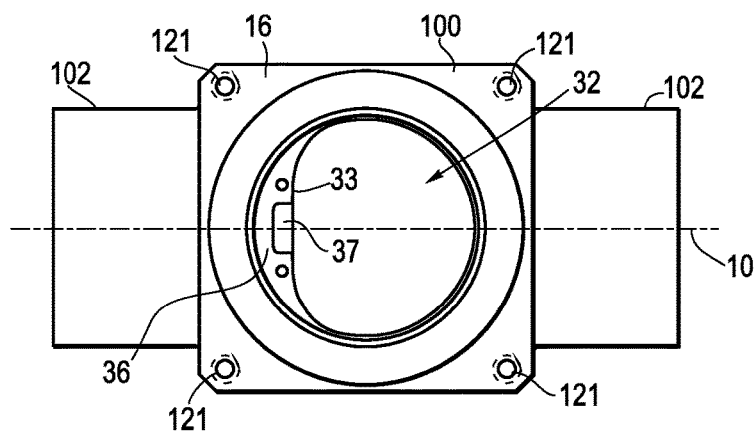
Figure 6J:
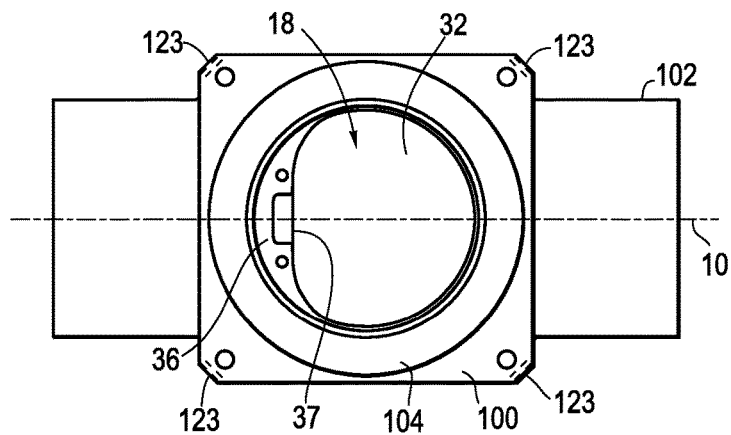
Figure 7:
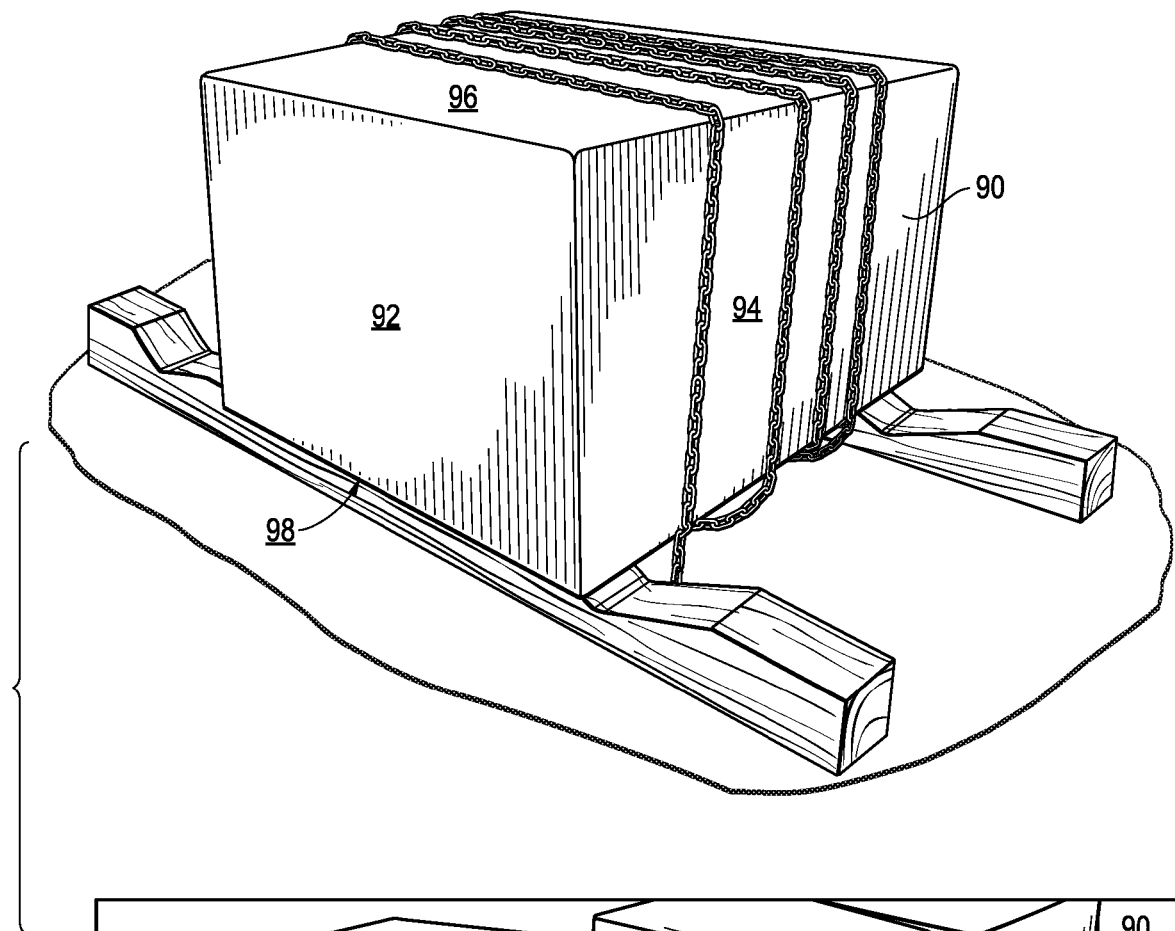
FIG. 7 is a perspective view of a block forged body.
Figure 7:
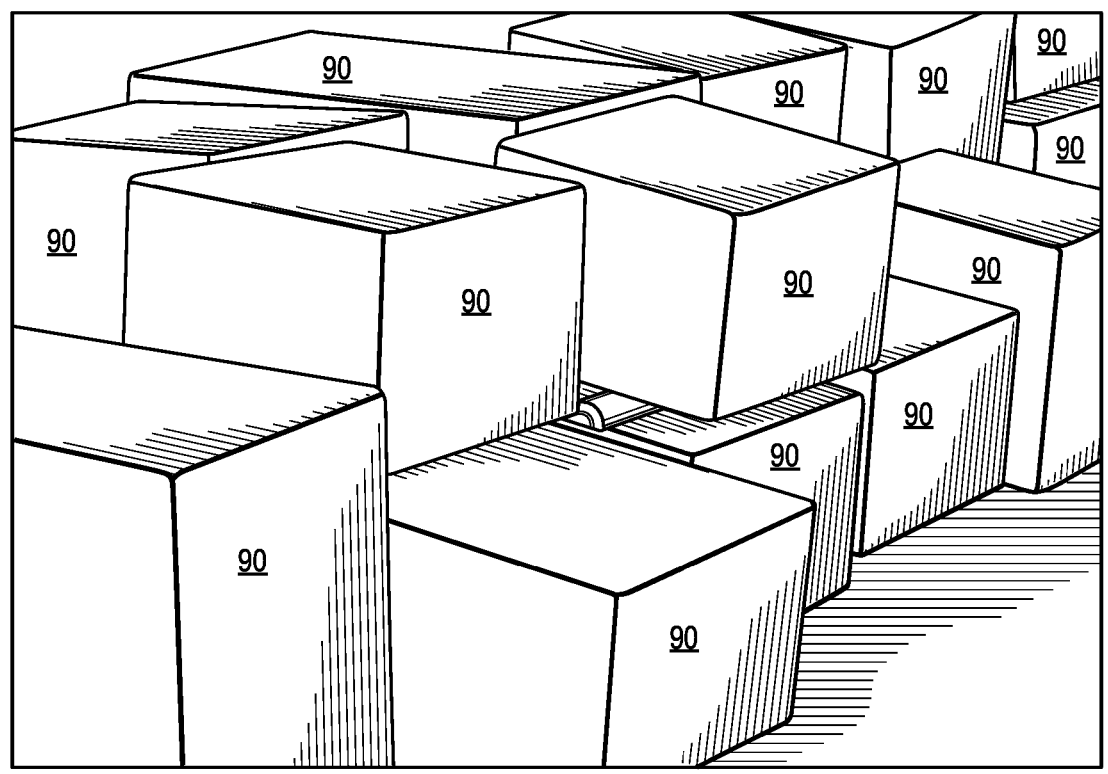

Referring to FIGS. 6A-6J and 7, a one-piece body is formed by block (hot) forging a block 90 of 15NiCuMoNb5 1.6368(WB 36) Alloy Steel, which has opposite ends 92, opposite sides 94, a top 96 and a bottom 98 (see FIGS. 7 and 6A). For example, and without limitation, the length may be from 27.5 inches to 44.5 inches, the width from 20.5 inches to 34 inches and the height from 26 inches to 40 inches. Rough machining may be performed to shape the outside surface of the end portions and head portion, defining a generally inverted T-shape, with a central block, having a rectangular prism 100 shape that which may be a cube in one embodiment, cylindrical end portions 102 extending from opposite ends of the prism, and a cylindrical neck portion 104 extending upwardly from the top of the prism. The prism provides increased strength and thickness, while also providing a flat bottom surface 106 for ease of mounting and locating of the valve body (see FIGS. 4 and 6B). The term "machining" refers to any of various processes in which a piece of raw material is reconfigured into a desired final shape and size by a controlled material-removal process, for example with the use of machine tools. The three principal machining processes are turning, drilling and milling. Other operations include shaping, planing, boring, broaching and sawing. Computer numerical control (CNC) machines may be used, for example a vertical turning latch (VTL) may be used to pre-machine the neck and flow bore/passageway as shown in FIGS. 6B and C.

As shown in FIGS. 6B and 6C, a through hole or flow bore 108 is machined (e.g., using VTL) along the first longitudinal axis 10 between the opposite ends to define the flow passageway. The through hole may be cylindrical, or have a tapered, frusto-conical shape with a minimum diameter as disclosed herein.

Multiple machining operations may be performed to configure the chamber 18 with different circumferential grooves and ribs. Before, or after machining of the through-hole, the process includes machining (e.g., VTL) the chamber 18 from the top 96 of the body along the longitudinal axis 30. Multiple machining operations may be performed to configure the chamber with different upper and lower portions as disclosed herein, as shown in FIGS. 6D-H. For example, the flow bore 108 and chamber 18 are used as references for further machining, using for example a horizontal machining center (HMC). The configuration of the chamber 18 on the top side is further refined using a CNC lathe as shown in FIG. 6E. A CNC lathe is also used to machine the final configuration of the through hole 108 as shown in FIGS. 6 F and G, finishing the upstream and downstream ends, for example with a flared and tapered opening 103. The same machining process may be applied to both end portions 102.

Referring to FIG. 6H, the process further includes machining the D-shaped passageway 32, for example using pocket milling through the floor between the chamber 18 and the through hole 108, and further down through the through hole 108 which may occur before or after one or both of the machining of the through hole and chamber. The machining may further include machining the cavity 60 in the bottom of the body below the flow passageway as the D-shaped passageway 32 is machined. The machining of the passageway 32, or of the chamber, forms the shelf portion 36. The curved portion of the D-shaped passageway eliminates the annular shoulder on the side thereof. The edges of the intersection of the passageway 32 and the through hole may be provided with a chamfer 131, which also serves as a stop for the support arm.

The process further includes machining (see FIGS. 6F and G) the first annular shoulders 40 under the spaced apart shelf portions 36, and machining the second annular shoulders or grooves 46 outboard of the first annular shoulders, again in either sequence. One of the first shoulders may be formed by the machining of the passageway 32 into the central cylindrical cavity 115 formed by the upstream and downstream operations defining upstream and downstream 111, 113 portions thereof. Top face holes 121 may be formed by drilling as shown in FIG. 6I. The outside corners 123 of the prism block 100 may be chamfered as shown in FIG. 6J, for example using HMC. The overall outer surface may then be deburred, for example using a grinder.

The process includes inserting a valve seat 50 into the annular shoulder 40 underlying the shelf 36, which fully encapsulates the valve seat, and with the entirety of the depth D1 of the circumferential surface 42 being in contact with a respective valve seat. The valve seat is then connected to the body by welding the backside of the valve seat to the body, and in particular by welding the valve seat to the body along the second annular shoulder.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method of manufacturing a swing check valve body comprising:
    block forging a one-piece body having opposite ends, opposite sides, a top and a bottom;
    machining a through hole having a first minimum diameter and extending along a first axis between the opposite ends, wherein the through hole defines a flow passageway;
    machining a chamber having a second minimum diameter and extending downwardly from the top along a second axis, wherein the first and second axes are orthogonal, and wherein the chamber comprises a bottom defined by a floor separating the chamber from the through hole;
    machining a D-shaped passageway through the floor along the second axis between the chamber and the through hole, wherein the D-shaped passageway comprises a linear wall and a curved wall opposite the linear wall, and wherein floor comprises a shelf portion overlying the through hole;
    machining an annular shoulder having a third minimum diameter greater than the first minimum diameter and extending along the first axis under the shelf portion, wherein the annular shoulder is coaxial with the through hole; and
    securing a valve seat in the annular shoulder such that the valve seat is not moveable along the first axis, wherein at least a portion of the valve seat underlies the shelf portion.

2. The method of claim 1 wherein the valve seat has a tapered width.

3. The method of claim 1 wherein block forging the one-piece body comprises block forging a rectangular prism.

4. The method of claim 1 wherein securing the valve seat in the annular shoulder further comprises welding a backside of the valve seat to the one-piece body.

5. The method of claim 4 wherein: the annular shoulder is a first annular shoulder; the method further comprises: machining a second annular shoulder outboard of the first annular shoulder, the second annular shoulder has a fourth minimum diameter and extends along the first axis, wherein the first and second annular shoulders are coaxial, and wherein the fourth minimum diameter is less than the third minimum diameter; and welding the backside of the valve seat comprises welding the backside of the valve seat to the one-piece body along the second annular shoulder.

6. The method of claim 1 wherein the shelf portion has a semi-circular shape.

7. The method of claim 1 wherein a front side of the valve seat comprises a hard sealing surface.

8. The method of claim 1 wherein machining the D-shaped passageway through the floor between the chamber and the through hole further comprises machining the D-shaped passageway along the second axis across the through hole and into a bottom of the one-piece body on an opposite side of the through hole from the chamber.

9. The method of claim 1 further comprising changing a dimension of one or more of the first minimum diameter, the second minimum diameter, the third minimum diameter, or the D-shaped passageway.

10. The method of claim 1 further comprising: mounting a valve in the one-piece body, wherein mounting the valve comprises pivotally mounting a support arm about a hinge axis positioned above the shelf portion and through hole, wherein the support arm and valve head are pivotable about the hinge axis from a closed position, wherein the valve head is disposed in the through hole in engagement with the valve seat, to an open position, and wherein the valve head is spaced apart from the valve seat.

11. The method of claim 10 further comprising securing a bonnet to the top of the one-piece body and thereby covering a top of the chamber.

12. A swing check valve body comprising:
    a one-piece block forged body comprising opposite ends, opposite sides, a top and a bottom, the one-piece block forged body further comprising:
        a through hole having a first minimum diameter and extending along a first axis between the opposite ends, wherein the through hole defines a flow passageway;

a chamber having a second minimum diameter and extending from the top along a second axis, wherein the first and second axes are orthogonal, and wherein the chamber comprises a bottom defined by a floor separating the chamber from the through hole;

a D-shaped passageway extending through the floor between the chamber and the through hole, wherein the floor comprises a shelf portion overlying the through hole; and an annular shoulder having a third minimum diameter and extending along the first axis under the shelf portion, and wherein the annular shoulders is coaxial with the through hole; and a valve seat non-moveably secured in the annular shoulder, wherein at least a portion of the valve seat underlies the shelf portion.

13. The swing check valve body of claim 12 wherein the valve seat has a tapered width.

14. The swing check valve body of claim 12 wherein a backside of the valve seat is welded to the one-piece block forged body.

15. The swing check valve body of claim 14 wherein: the annular shoulder is a first annular shoulder; the swing check valve body further comprises: a second annular shoulder disposed outboard of the first annular shoulder, the second annular shoulder has a fourth minimum diameter and extends along the first axis, wherein the first and second annular shoulders are coaxial, and wherein the fourth minimum diameter is less than the third minimum diameter; and the backside of the valve seat is welded to the one-piece block forged body along the second annular shoulder.

16. The swing check valve body of claim 12 wherein a front side of the valve seat comprises a hard sealing surface.

17. The swing check valve body of claim 12 wherein the D-shaped passageway extends across the through hole and into a bottom of the one-piece block forged body on an opposite side of the through hole from the chamber.

18. The swing check valve body of claim 12, further comprising: a valve mounted to the one-piece block forged body, the valve comprising a support arm pivotally mounted about a hinge axis positioned above the shelf portion and through hole, and a valve head coupled to the support arm, wherein the support arm and the valve head are pivotable about the hinge axis from a closed position, wherein the valve head is disposed in the through hole in engagement with the valve seat, to an open position, and wherein valve head is spaced apart from the valve seat.

19. The swing check valve body of claim 18 further comprising a bonnet secured to the top of the one-piece block-forged body to cover the chamber.

* * * * *